US009247281B2

(12) United States Patent
Wu et al.

(10) Patent No.: US 9,247,281 B2
(45) Date of Patent: Jan. 26, 2016

(54) HANDHELD ELECTRONIC DEVICE HAVING UNIVERSAL REMOTE CONTROL MECHANISM AND OPERATION METHOD OF THE SAME

(71) Applicant: HTC Corporation, Taoyuan, Taoyuan County (TW)

(72) Inventors: Yi-Hsien Wu, Taoyuan (TW); Chien-Lung Chou, Taoyuan (TW); Abhishek Saxena, Taoyuan (TW); Chen-Huang Fan, Taoyuan (TW); Chia-Wei Chen, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 364 days.

(21) Appl. No.: 13/739,031

(22) Filed: Jan. 11, 2013

(65) Prior Publication Data
US 2014/0197932 A1    Jul. 17, 2014

(51) Int. Cl.
*H04N 21/4227* (2011.01)
*H04N 21/422* (2011.01)

(52) U.S. Cl.
CPC ... *H04N 21/42224* (2013.01); *H04N 21/42208* (2013.01); *H04N 21/42225* (2013.01); *H04N 21/42228* (2013.01); *G08C 2201/92* (2013.01); *G08C 2201/93* (2013.01)

(58) Field of Classification Search
CPC .......... H04N 21/422; H04N 21/42208; H04N 21/42224; H04N 21/42225; H04N 21/42226; H04N 21/42227; H04N 21/42228; H04N 21/4126; H04N 21/4222; G08C 2201/91; G08C 2201/92; G08C 2201/93
USPC ....................... 340/12.23, 12.24, 12.25, 12.28
See application file for complete search history.

(56) References Cited

U.S. PATENT DOCUMENTS

| 5,614,906 A * | 3/1997 | Hayes et al. ................... 341/176 |
| 6,788,241 B2 * | 9/2004 | Arling et al. ................... 341/176 |
| 2009/0023958 A1 | 1/2009 | Jun et al. |

FOREIGN PATENT DOCUMENTS

| CN | 202443574 U | 9/2012 |
| EP | 2145326 B1 | 2/2012 |
| TW | 200714071 A | 4/2007 |

OTHER PUBLICATIONS

Taiwan Notice of Allowance dated Sep. 9, 2014.
English translation of abstract of CN 202443574 U (published Sep. 19, 2012).
English translation of abstract of TW 200714071 A (published Apr. 1, 2007).

\* cited by examiner

*Primary Examiner* — Fekadeselassie Girma
*Assistant Examiner* — Benyam Haile
(74) *Attorney, Agent, or Firm* — McClure, Qualey & Rodack, LLP (57) ABSTRACT

A handheld electronic device having a universal remote control mechanism is provided. The electronic device comprises a touch display unit, a storage unit, a wireless transmission unit and a processing unit. The touch display unit receives device information and displays a user interface having virtual function keys. The storage unit stores a device code discrimination table. The processing unit retrieves the device code discrimination table and initiates a test procedure according to an order of the hit rate of the instruction codes of plural rows of device codes in the device code discrimination table. The processing unit further terminates the test procedure and controls the electronic device to be controlled by using a specific device code when the processing unit can control the electronic device to be controlled by using all the instruction codes of the specific device code through the wireless transmission unit.

18 Claims, 6 Drawing Sheets

| Code | Power | Channel + | Channel - | Volume + | Volume - | Mute | Menu | Enter | Upper |
|------|-------|-----------|-----------|----------|----------|------|------|-------|-------|
| 001 | 10h | 20h | 30h | 40h | 50h | 60h | 70h | 80h | 90h |
| 002 | 10h | 20h | 30h | 40h | 50h | 61h | 71h | 81h | 91h |
| 003 | 10h | 20h | 30h | 40h | 50h | 61h | 71h | 81h | × |
| 004 | 11h | 21h | 31h | 41h | 51h | 61h | 71h | × | × |
| 005 | 11h | 21h | 31h | 41h | 51h | 61h | 71h | 81h | × |
| 006 | 11h | 22h | 32h | 42h | 52h | 62h | 72h | × | 92h |

HANDHELD ELECTRONIC DEVICE HAVING UNIVERSAL REMOTE CONTROL MECHANISM AND OPERATION METHOD OF THE SAME

BACKGROUND

1. Field of Invention

The disclosure relates to a universal remote control technology. More particularly, the disclosure relates to a handheld electronic device having a universal remote control mechanism and an operation method thereof.

2. Description of Related Art

In order to increase the convenience for life or meet the entertainment demand in a family, various household appliances are usually purchased. Many appliances, such as a television, a video recorder, a stereo system and an air conditioner, are all configured with an independent remote controller correspondingly. When there are more and more appliances presented, the number of remote controllers is increased accordingly. Therefore, the user may be confused by different remote controllers, may lose the remote controllers or may damage the remote controllers. The large number of the remote controllers cause inconvenience for using household appliances.

When the remote controller is lost or damaged, users often purchase a universal remote controller to replace the original remote controller. In order to enable the universal remote controller to operate the appliances, device codes of different brands, types and models of the appliances should be provided in the universal remote controller, and a complicated test procedure is performed to find a correct device code for operation. However, the general remote controller in the market has no intuitive display mechanism to inform users of how the procedure is performed. Users not only need to try every device code but also need to pay attention to keep in mind that which function key is selected for testing at any time. Besides the concentration that the user needs, the test procedure with low efficiency also makes the whole procedure quite time-consuming and strenuous.

Therefore, it is an urgent problem to solve for the industry that how one handheld electronic device having an intuitive display mechanism which can find the corresponding device code quickly and the operation method thereof are designed.

SUMMARY

Therefore, an aspect of the disclosure provides a universal remote control operation method, used for a handheld electronic device. The handheld electronic device includes a touch display unit, a storage unit, a processing unit and a wireless transmission unit. The universal remote control operation method includes: enabling the touch display unit to receive device information and display a user interface having a plurality of virtual function keys according to the device information; enabling the processing unit to retrieve a device code discrimination table from the storage unit, including a plurality of rows of device codes respectively corresponding to one specific type of device, wherein each of the plurality of rows of device codes includes a plurality of instruction codes in an order of the hit rate; and enabling the processing unit to initiate a test procedure which includes: (a) enabling one instruction code having the highest hit rate of the instruction codes of the specific device code of the device code discrimination table as a first instruction code; (b) controlling the touch display unit to receive an input from a specific virtual function key of the virtual function keys, wherein the specific virtual function key corresponds to the first instruction code; (c) enabling the processing unit to control the wireless transmission unit to transmit a function instruction to an electronic device to be controlled according to the input and the first instruction code; (d) enabling the processing unit to determine whether the electronic device to be controlled is operated according to the function instruction; (e) excluding the specific device code and the device codes having the same first instruction code in the plurality of rows of device codes by the processing unit to enable one device code of the remaining plurality of rows of device codes as the specific device code to repeat steps (a)-(d) for testing, when the electronic device to be controlled is not operated according to the function instruction; (f) further determining whether the first instruction code is a final instruction code of the specific device code by the processing unit when the electronic device to be controlled is operated according to the function instruction, to enable a second instruction code after the first instruction code in the specific device code as the first instruction code to repeat steps (b)-(d) for testing when the first instruction code is not the final instruction code; and (g) terminating the test procedure by the processing unit when the electronic device to be controlled is operated according to the function instruction and the first instruction code is the final instruction code and controlling the electronic device to be controlled by using the specific device code.

According to an embodiment of the disclosure, an instruction code having the highest hit rate of the instruction codes is an instruction code having the highest similarity in the instruction codes of the plurality of rows of device codes.

According to another embodiment of the disclosure, step (b) further includes enabling the processing unit to control the touch display unit according to the first instruction code to generate first prompt information at the specific virtual function key, to enable the touch display unit to receive the input. Step (f) further includes enabling the processing unit to control the touch display unit to enable the specific virtual function key corresponding to the first instruction code to generate second prompt information. The first prompt information and the second prompt information are generated as the touch display unit enables the specific virtual function key to perform a flicking or a color change.

According to a further embodiment of the disclosure, step (f) further includes enabling the processing unit to determine whether the remaining instruction codes are repeated in the specific device code and the device codes having the same first instruction code in the plurality of rows of device codes and to determine whether the repeated instruction codes can enable the electronic device to be controlled to operate according to the function instruction if the instruction codes are repeated. The processing unit further enables an instruction code not repeated in the instruction codes as the first instruction code to repeat steps (b)-(d) for testing.

According to yet a further embodiment of the disclosure, step (d) further includes: enabling the processing unit to determine whether the touch display unit receives a confirmation input; and enabling the processing unit to determine whether the electronic device to be controlled is operated according to the function instruction when the confirmation input is received.

According to still yet a further embodiment of the disclosure, step (g) further includes recording a corresponding relationship between the specific device code and the electronic device to be controlled according to environment information. The environment information is wireless access point signal strength around the electronic device to be controlled, a vertical height or a corresponding orientation.

According to another embodiment of the disclosure, the device information includes a device brand and a device type.

An aspect of the disclosure provides a handheld electronic device having a universal remote control mechanism, including a touch display unit, a storage unit, a wireless transmission unit and a processing unit. The touch display unit receives device information and displays a user interface having a plurality of virtual function keys. The storage unit stores a device code discrimination table, including a plurality of rows of device codes respectively corresponding to one specific type of device, wherein each of the plurality of rows of device codes includes a plurality of instruction codes in an order of the hit rate. The processing unit retrieves the device code discrimination table from the storage unit and initiates a test procedure, wherein the test procedure includes: (a) enabling an instruction code having the highest hit rate of the instruction codes of the specific device code of the device code discrimination table as a first instruction code by the processing unit; (b) controlling the touch display unit to receive an input from a specific virtual function key of the virtual function keys by the processing unit, wherein the specific virtual function key corresponds to the first instruction code; (c) controlling the wireless transmission unit to transmit a function instruction to an electronic device to be controlled according to the input and the first instruction code by the processing unit; (d) determining whether the electronic device to be controlled is operated according to the function instruction by the processing unit; (e) excluding the specific device code and the device codes having the same first instruction code in the plurality of rows of device codes by the processing unit to enable one device code of the remaining plurality of rows of device codes as the specific device code to repeat steps (a)-(d) for testing; (f) further determining whether the first instruction code is the final instruction code of the specific device code by the processing unit when the electronic device to be controlled is operated according to the function instruction, to enable a second instruction code after the first instruction code in the specific device code as the first instruction code to repeat steps (b)-(d) when the first instruction code is not the final instruction code; and (g) terminating the test procedure by the processing unit when the electronic device to be controlled is operated according to the function instruction and the first instruction code is the final instruction code and controlling the electronic device to be controlled by using the specific device code.

According to an embodiment of the disclosure, an instruction code having the highest hit rate of the instruction codes is an instruction code having the highest similarity of the instruction codes of the plurality of rows of device codes.

According to another embodiment of the disclosure, step (b) further includes controlling the touch display unit by the processing unit to generate first prompt information at the specific virtual function key according to the first instruction code, to enable the touch display unit to receive the input. Step (f) further includes controlling the touch display unit by the processing unit to enable the specific virtual function key corresponding to the first instruction code to generate second prompt information. The first prompt information and the second prompt information are generated as the touch display unit enables the specific virtual function key to perform a flicking or a color change.

According to another embodiment of the disclosure, step (f) further includes enabling the processing unit to determine whether the remaining instruction codes are repeated in the specific device code and the device codes having the same first instruction code in the plurality of rows of device codes and to determine whether the repeated instruction codes can enable the electronic device to be controlled to operate according to the function instruction if the instruction codes are repeated. The processing unit further enables an instruction code not repeated in the instruction codes as the first instruction code to repeat steps (b)-(d) for testing.

According to a further embodiment of the disclosure, step (d) further includes: determining whether the touch display unit receives a confirmation input by the processing unit; and determining whether the electronic device to be controlled is operated according to the function instruction by the processing unit when the confirmation input is received.

According to yet a further embodiment of the disclosure, step (g) further includes recording a corresponding relationship between the specific device code and the electronic device to be controlled according to environment information. The environment information is wireless access point signal strength around the electronic device to be controlled, a vertical height or a corresponding orientation.

According to still yet a further embodiment of the disclosure, the device information includes a device brand and a device type.

BRIEF DESCRIPTION OF THE DRAWINGS

In order to make the foregoing as well as other purposes, features, advantages and embodiments of the disclosure more apparent, the accompanying drawings are described as follows.

DETAILED DESCRIPTION

Figure 1:
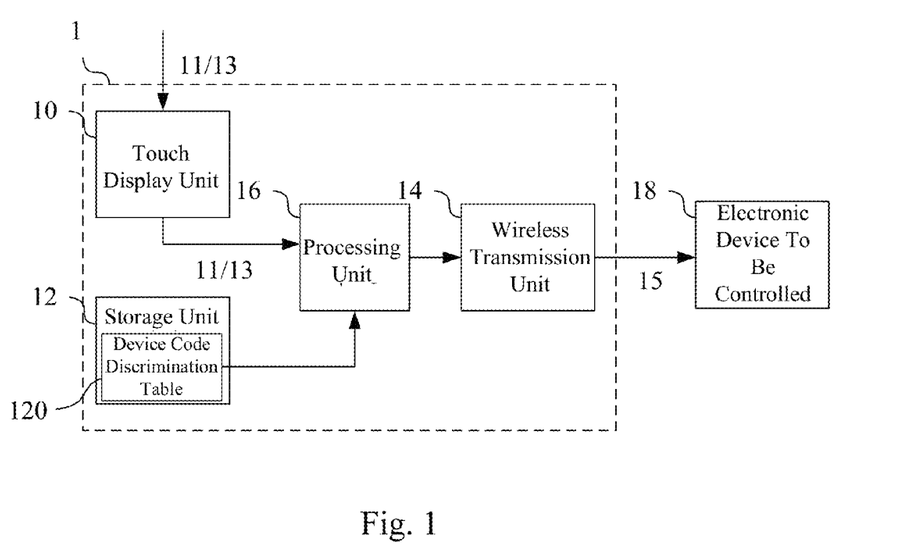
FIG. 1 is a block diagram of a handheld electronic device in an embodiment of the invention.
Figure 2:
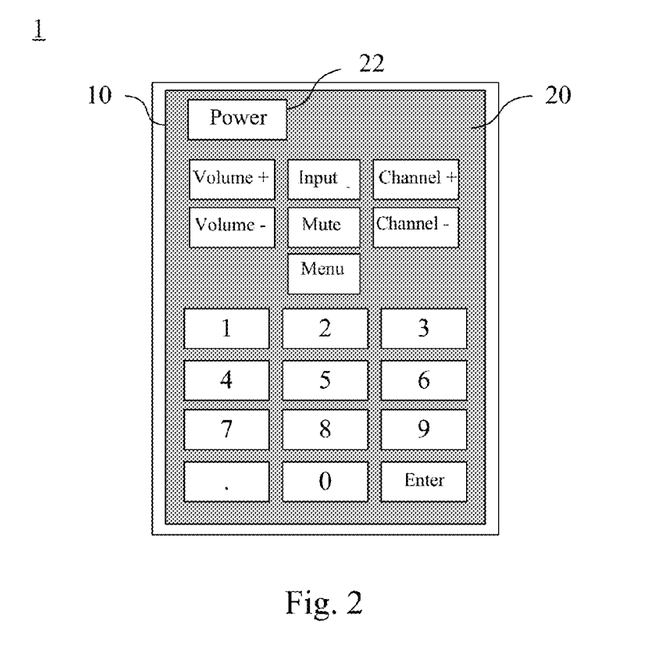
FIG. 2 is a top view of a handheld electronic device in an embodiment of the invention.

References are made to both of FIGS. 1 and 2. FIG. 1 is a block diagram of a handheld electronic device 1 in an embodiment of the invention. FIG. 2 is a top view of a handheld electronic device 1 in an embodiment of the invention. The handheld electronic device 1 has a universal remote control mechanism which can be a smart mobile phone, a tablet PC or other handheld electronic device in different embodiments. The handheld electronic device 1 includes a touch display unit 10, a storage unit 12, a wireless transmission unit 14 and a processing unit 16.

The touch display unit 10 is used for receiving device information 11. In an embodiment, the device information 11 includes a device brand and a device type. For example, users can input, for example, but not limited to, a Sony television or a Toshiba air conditioner through the touch display unit 10, as the device information 11. The touch display unit 10 will display a user interface 20 included as shown in FIG. 2 according to the device information 11. The user interface 20 includes a plurality of virtual function keys 22.

Taking a television as an example, the virtual function keys 22 may include, for example, but not limited to, a power key, volume adjustment keys (such as volume + and volume − in FIG. 2), channel adjustment keys (such as channel + and channel − in FIG. 2), a menu key, a mute key, number keys and so on.

The storage unit 12 stores a device code discrimination table 120. The device code discrimination table 120 is used for storing a plurality of device codes each corresponding to one specific type of device. After the processing unit 16 retrieves the device code discrimination table 120 from the storage unit 12 according to the device information 11, an electronic device to be controlled 18, i.e., an electronic device corresponding to the aforesaid device information 11 inputted by users, can be tested by the processing unit 16 so as to know which one of the device codes can operate the electronic device to be controlled 18. In the test procedure, after an instruction is generated by the processing unit 16 according to the device code discrimination table 120, the wireless transmission unit 14 is controlled to transmit the instruction to the electronic device to be controlled 18 for testing. In an embodiment, the wireless transmission unit 14 may be, for example, but not limited to, an infrared transmission unit, so that a receiving module (not illustrated) corresponding to the electronic device to be controlled 18 receives the instruction.

Figure 3:
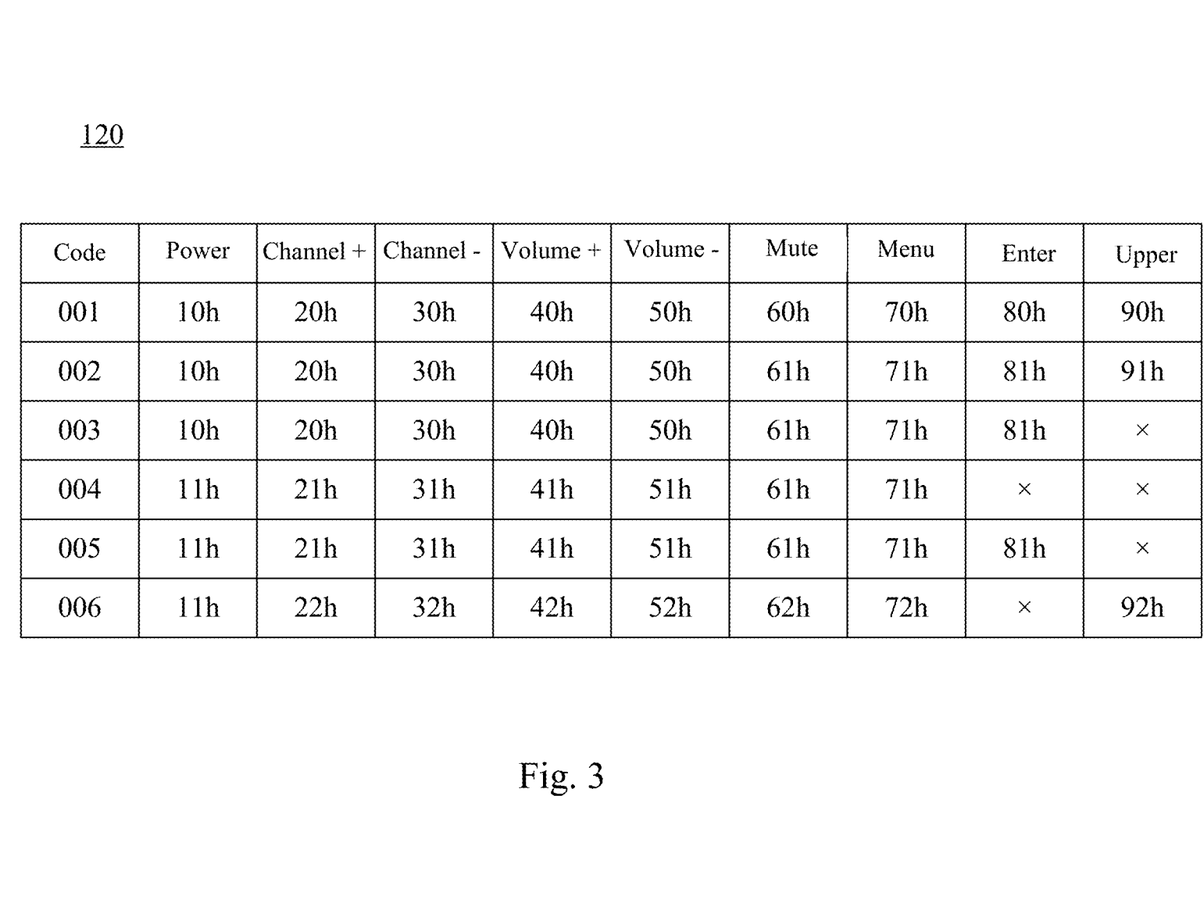
FIG. 3 is a schematic view of a device code discrimination table in an embodiment of the invention.

Reference is made to FIG. 3. FIG. 3 is a schematic view of the device code discrimination table 120 in an embodiment of the invention.

In this embodiment, the device code discrimination table 120 includes a plurality of rows of device codes which are numbered as 001, 002, 003, . . . 006. Each device code corresponds to one specific type of device. Each row of device codes includes a plurality of instruction codes. For example, in the device code numbered as 001, an instruction code of the power key is 10h, an instruction code of the channel increase (channel +) key is 20h and an instruction code of the channel decrease (channel −) key is 30h, and the rest can be done in the same manner. It should be noted that, the device code discrimination table 120 shown in the embodiment is only an example and the number of device codes included in the device code discrimination table 120 and the number of instruction codes included in each device code can be adjusted according to the actual condition.

In this embodiment, the instruction codes in each device code are ordered according to the hit rate. In the embodiment, the term "hit rate" is related to the similarity of the instruction codes in the device codes. That is, the instruction code having a high hit rate is repeated mostly in the device codes. In other words, the instruction codes can be ordered according to the opposite meaning of the hit rate, i.e., a discrimination rate. That is, when the discrimination rate is lower, the hit rate is higher. For example, if one instruction code is repeated in multiple sets of device codes, it is difficult to discriminate different device codes based on this instruction code and the discrimination rate will be low. However, since many device codes comply with the instruction code, the hit rate is high. On the other hand, if one instruction code only appears in one set of device codes, the instruction code can be used for discriminating the set of device codes from other device codes easily and the discrimination rate is high. However, since only one device code complies with the instruction code, the hit rate is low.

The device code discrimination table 120 illustrated in FIG. 3 is taken as an example. In six device codes of the power key, three device codes have the same instruction code 10h. Therefore, the hit rate of the power key is highest. Similarly, the channel increase (channel +) key, the channel decrease (channel −) key, the volume increase (volume +) key and the volume decrease (volume −) key also have the highest hit rate. Therefore, the several instruction codes will be ordered in priority and in this embodiment they are ordered on the left side of the table in priority. In an embodiment, among the rows of device codes, several device codes having a higher similarity also can be classified in the same group, as shown in FIG. 3.

Figure 4A:
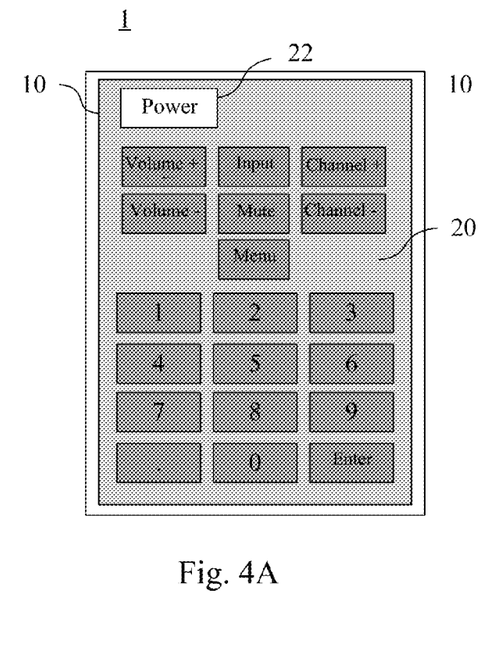
FIGS. 4A to 4C are tops views of a handheld electronic device in a test procedure in an embodiment of the invention respectively.
Figure 4B:
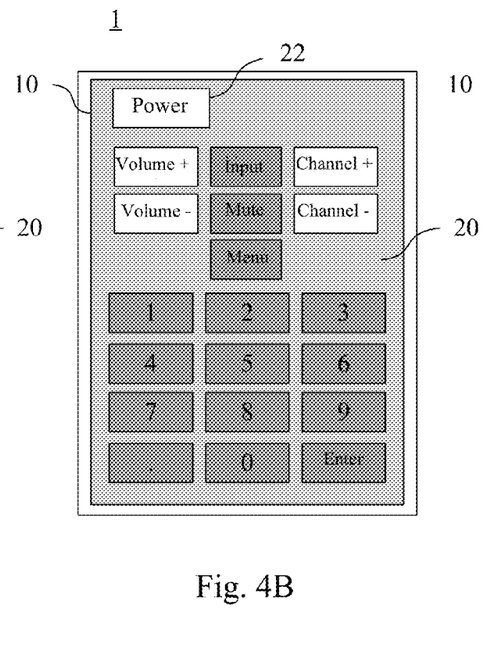
Figure 4C:
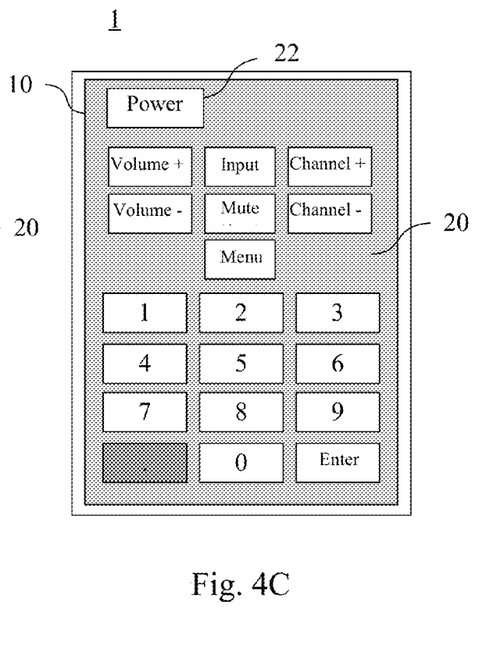

Therefore, after the processing unit 16 in FIG. 1 retrieves the device code discrimination table 120, the test procedure is performed by the ordering method of the table. References are made to FIG. 1 and FIGS. 4A-4C. FIGS. 4A to 4C are tops views of the handheld electronic device 1 in the test procedure in an embodiment of the invention respectively.

When the test procedure is initiated, at step (a), the processing unit 16 enables an instruction code having the highest hit rate in the instruction codes of one specific device code in the device code discrimination table 120 as a first instruction code. The device code discrimination table 120 in FIG. 3 is taken as an example. The processing unit 16 can enable the device code numbered as 001 as the specific device code in priority and enable the instruction code of the power key 10h as the first instruction code.

At step (b), the processing unit 16 controls the touch display unit 10 to receive an input 13 from a specific virtual function key of the virtual function keys 22, wherein the specific virtual function key corresponds to the first instruction code. In the embodiment, since the first instruction code is the instruction code of the power key 10h, the specific virtual function key is the power key.

As shown in FIG. 4A, in an embodiment, at first, the processing unit 16 can enable the specific virtual function key (such as the power key in the embodiment) to generate first prompt information according to the first instruction code, i.e., the instruction code 10h corresponding to the power key. The first prompt information can be a flicking or a color change to prompt users that the power key will be tested now. After users touch the power key, the processing unit 16 can receive the input 13.

At step (c), the processing unit 16 controls the wireless transmission unit 14 to transmit a function instruction 15 to the electronic device to be controlled 18 according to the input and the first instruction code.

At step (d), the processing unit 16 determines whether the electronic device to be controlled 18 is operated according to the function instruction 15. In an embodiment, if the wireless transmission unit 14 is a unidirectional transmission unit, such as an infrared transmission unit type, the processing unit 16 needs to determine whether the touch display unit 10 receives a confirmation input from users (not illustrated) to determine whether the electronic device to be controlled 18 has been operated according to the function instruction 15. In an embodiment, the processing unit 16 can generate virtual option keys for users to select "yes" or "no" so as to determine that the electronic device to be controlled 18 is not operated according to the function instruction 15 when an input "no" is received. In another embodiment, when the processing unit 16 does not receive the confirmation input in a specific period, it is determined that the electronic device to be controlled 18 is not operated according to the function instruction 15.

When the electronic device to be controlled 18 is not operated according to the function instruction 15, at step (e), the processing unit will exclude the specific device code and the device codes having the same first instruction code in the plurality of rows of device codes. In the embodiment, the device code having the instruction code of the power key 10h, i.e., the device code numbered as 001 and the device codes numbered as 002 and 003 are all excluded.

The processing unit 16 further enables a device code of the remaining device codes as the specific device code to repeat steps (a)-(d) for testing. For example, if the function instruction 15 generated according to the instruction code of the power key 10h cannot enable the electronic device to be controlled 18 to operate, the processing unit 16 will exclude the device codes numbered as 001-003 and further enable the device code numbered as 004 as the specific device code and the test for steps (a)-(d) is performed. If the device code numbered as 004 is still not suitable, the next suitable device code is searched for testing.

At step (d), when the processing unit 16 determines that the electronic device to be controlled 18 is operated according to the function instruction 15, the processing unit 16 further determines whether the first instruction code is a final instruction code of the specific device code at step (f). The embodiment is taken as an example. If the function instruction 15 generated by the instruction code of the power key 10h can enable the electronic device to be controlled 18 to operate, the processing unit 16 will determine that the instruction code of the power key 10h is not the final instruction code and enable the second instruction code after the first instruction code as the first instruction code and steps (b)-(d) are repeated for testing. That is, the processing unit 16 can select the instruction code of the channel increase (channel +) 20h as the next instruction code for testing.

However, in an embodiment, the processing unit 16 can further determine whether the remaining instruction codes are repeated in the specific device code (numbered as 001) and other device codes (numbered as 002 and 003) having the same first instruction code. That is, the processing unit 16 can determine whether other instruction codes of the device codes numbered as 001, 002 and 003, are repeated. In the embodiment, the channel increase (channel +) key, the channel decrease (channel −) key, the volume increase (volume +) key and the volume decrease (volume −) key are all repeated. Therefore, the processing unit 16 can directly determine that these repeated instruction codes can enable the electronic device to be controlled 18 to operate according to the function instruction 15 generated by the processing unit 16, without a further test. The processing unit 16 can enable an instruction code not repeated in the instruction codes, such as the instruction code of the mute key 60h, as the first instruction code to repeat steps (b)-(d) for testing, thereby accelerating the test procedure.

In an embodiment, as shown in FIG. 4B, the processing unit 16 can control the touch display unit 10, so that the virtual function key passing the test can be displayed by second prompt information. In the embodiment, the second prompt information is shown as a color change, to prompt users that the virtual function key has passed the test.

In an embodiment, when several instruction codes in the specific device code pass the test and the next instruction code does not pass the test, the processing unit 16 can select a device code from the remaining device codes having the highest similarity to the specific device code for testing, and the processing unit 16 can directly jump over the repeated instruction codes which pass the test and directly test the remaining instruction codes.

As shown in FIG. 4C, when the processing unit 16 determines that the electronic device to be controlled 18 is operated according to the function instruction 15 at step (d) and determines that the first instruction code is the final instruction code in the device codes at step (f), the processing unit 16 will terminate the test at step (g) and control the electronic device to be controlled 18 with the specific device code. Taking the embodiment as an example, when the processing unit 16 tests the upper key instruction code 90h of the device code numbered as 001 and determines that the instruction code has passed the test, the processing unit 16 will terminate the test procedure and control the electronic device to be controlled 18 with the specific device code.

Therefore, with the device code discrimination table which makes an order by using the hit rate of the instruction codes, the handheld electronic device of the invention can find the device codes quickly and perform the test, so as to find the device code corresponding to the electronic device to be controlled quickly and efficiently and perform the remote control.

In an embodiment, the processing unit 16 can further use the environment information of the electronic device to be controlled 18 to record the corresponding relationship between the specific device code and the electronic device to be controlled 18. For example, the environment information can be wireless access point signal strength around the electronic device to be controlled 18, a vertical height or a corresponding orientation. The processing unit 16 can obtain and record the related environment information by inbuilt modules, such as a wireless transmission module, a level and an e-compass. When users take the handheld electronic device 1 into the corresponding environment later, the processing unit 16 can know what the device code selected for use is, so as to operate the electronic device to be controlled 18 more quickly.

Figure 5A:
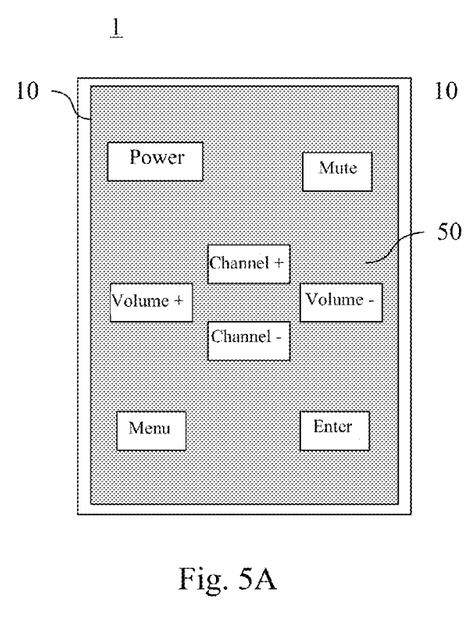
FIGS. 5A to 5C are tops views of a handheld electronic device having a user interface in an embodiment of the invention respectively.
Figure 5B:
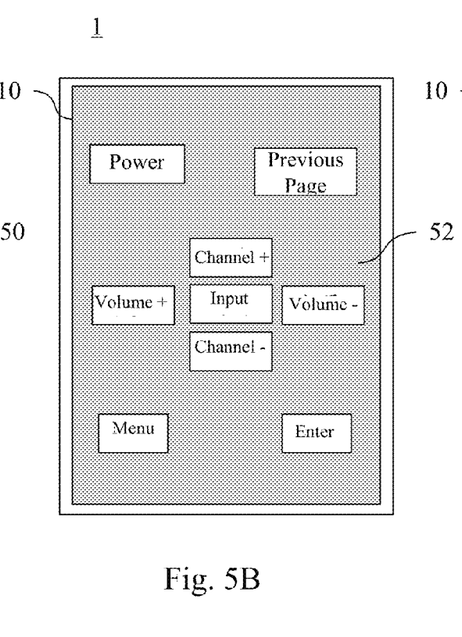
Figure 5C:
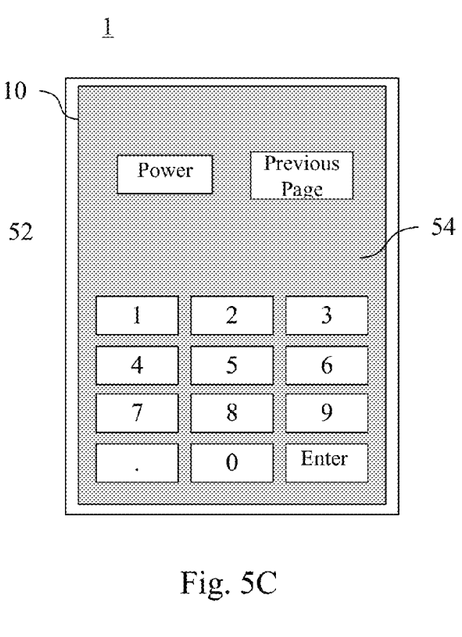

References are made to FIGS. 5A-5C. FIGS. 5A to 5C are tops views of the handheld electronic device 1 having user interfaces 50, 52 and 54 in an embodiment of the invention respectively. It should be noted that, the user interface 20 shown in FIG. 2 is only an example. In other embodiments, the number of the virtual function keys 22 and the layout configuration are used to display user interfaces of different configuration methods, depending on different device information 11.

Figure 6:
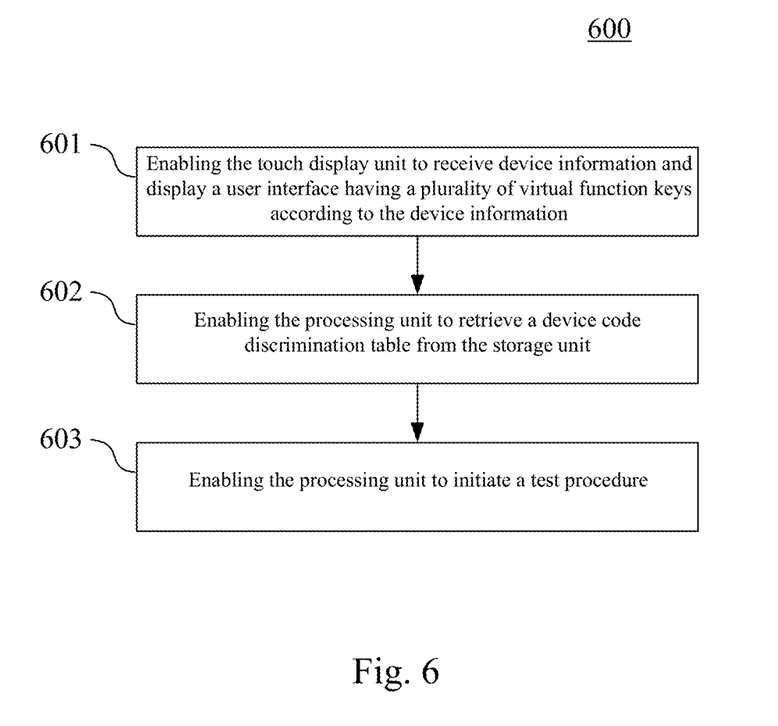
FIG. 6 is a flow chart of a universal remote control operation method in an embodiment of the invention.

Reference is made to FIG. 6. FIG. 6 is a flow chart of a universal remote control operation method 600 in an embodiment of the invention. The universal remote control operation method 600 can be used for the handheld electronic device 1 as shown in FIG. 1. The universal remote control operation method 600 includes the following steps (it should be known that, the sequence of all steps mentioned in this embodiment can be adjusted according to the actual need and they even can be performed simultaneously or partly simultaneously, except expressly specified otherwise).

At step 601, the touch display unit 10 is enabled to receive the device information 11 and display the user interface 20 having a plurality of virtual function keys 22 according to the device information 11.

At step 602, the processing unit 16 is enabled to retrieve the device code discrimination table 120 from the storage unit 12.

Figure 7:
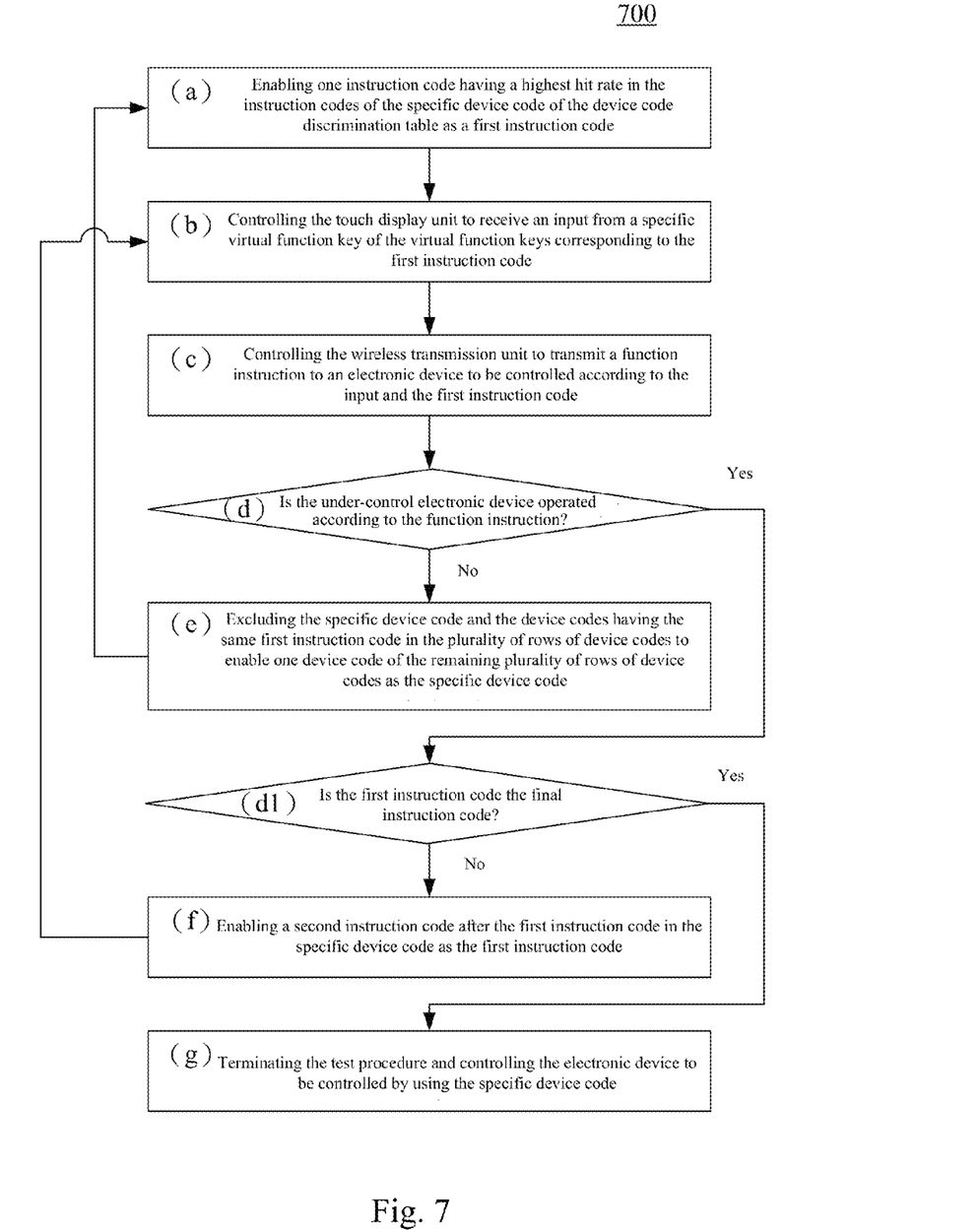
FIG. 7 is a flow chart of a test procedure in an embodiment of the invention.

At step 603, the processing unit 16 is enabled to initiate the test procedure. FIG. 7 is a flow chart of a test procedure 700 in an embodiment of the invention. As shown in FIG. 7, the test procedure 700 includes: at step (a), enabling an instruction code having the highest hit rate in the instruction codes of the specific device code of the device code discrimination table 120 as the first instruction code;

at step (b), controlling the touch display unit 10 to receive the input 13 from a specific virtual function key of the virtual function keys 22, wherein the specific virtual function key corresponds to the first instruction code;

at step (c), enabling the processing unit 16 to control the wireless transmission unit 14 to transmit the function instruction 15 to the electronic device to be controlled 18 according to the input 13 and the first instruction code; at step (d), enabling the processing unit 16 to determine whether the electronic device to be controlled 18 is operated according to the function instruction;

when the electronic device to be controlled 18 is not operated according to the function instruction 15, at step (e), the processing unit 16 excludes the specific device code and the device codes having the same first instruction code in the plurality of rows of device codes to enable a device code of the rows of remaining device codes as the specific device to repeat steps (a)-(d) for testing;

when the electronic device to be controlled 18 is operated according to the function instruction 15, at step (d1), the processing unit 16 further determines whether the first instruction code is the final instruction code of the specific device code to enable the second instruction code after the first instruction code in the specific device code as the first instruction code to repeat steps (b)-(d) when the first instruction code is not the final instruction code at step (f); and at step (g), when the electronic device to be controlled 18 is operated according to the function instruction 15 and the first instruction code is the final instruction code, the processing unit 16 terminates the test procedure and controls the electronic device to be controlled 18 by using the specific device code.

Although the disclosure has been disclosed with reference to the above embodiments, these embodiments are not intended to limit the disclosure. It will be apparent to those of skills in the art that various modifications and variations can be made without departing from the spirit and scope of the disclosure. Therefore, the scope of the disclosure should be defined by the appended claims.

What is claimed is:

1. A universal remote control operation method, applied in a handheld electronic device which comprises a touch display unit, a storage unit, a processing unit and a wireless transmission unit, the universal remote control operation method comprising:
    enabling the touch display unit to receive device information and display a user interface having a plurality of virtual function keys according to the device information;
    enabling the processing unit to retrieve a device code discrimination table from the storage unit, wherein the device code discrimination table comprises a plurality of rows of device codes each corresponding to one specific type of device, and each of the plurality of rows of device codes comprises a plurality of instruction codes arranged in an order of a hit rate; and
    enabling the processing unit to initiate a test procedure which comprises:
    (a) enabling one instruction code having the highest hit rate in the instruction codes of a specific device code of the device code discrimination table as a first instruction code;
    (b) controlling the touch display unit to receive an input from a specific virtual function key of the virtual function keys, wherein the specific virtual function key corresponds to the first instruction code;
    (c) enabling the processing unit to control the wireless transmission unit to transmit a function instruction to an electronic device to be controlled according to the input and the first instruction code;
    (d) enabling the processing unit to determine whether the electronic device to be controlled is operated according to the function instruction;
    (e) excluding the specific device code and the device codes having the same first instruction code in the plurality of rows of device codes by the processing unit when the electronic device to be controlled is not operated according to the function instruction, to enable one device code of the remaining plurality of rows of device codes as the specific device code to repeat steps (a)-(d) for testing;
    (f) further determining whether the first instruction code is a final instruction code of the specific device code by the processing unit when the electronic device to be controlled is operated according to the function instruction, to enable a second instruction code after the first instruction code in the specific device code as the first instruction code to repeat steps (b)-(d) for testing when the first instruction code is not the final instruction code, wherein the step (f) further comprises enabling the processing unit to determine whether the remaining instruction codes are repeated in the specific device and the device codes having the same first instruction code in the plurality of rows of device codes, and to determine whether the repeated instruction codes enables the electronic device to be controlled to operate according to the function instruction if the instruction codes are repeated, and further enabling one instruction code not repeated in the instruction codes as the first instruction code by the processing unit to repeat steps (b)-(d) for testing; and
    (g) terminating the test procedure by the processing unit and controlling the electronic device to be controlled by using the specific device code when the electronic device to be controlled is operated according to the function instruction and the first instruction code is the final instruction code.

2. The universal remote control operation method of claim 1, wherein the instruction code having the highest hit rate in the instruction codes is an instruction code appears most frequently among the plurality of rows of device codes.

3. The universal remote control operation method of claim 1, wherein the step (b) further comprises enabling the processing unit to control the touch display unit according to the first instruction code and generating first prompt information at the specific virtual function key to enable the touch display unit to receive the input.

4. The universal remote control operation method of claim 3, wherein the step (f) further comprises enabling the processing unit to control the touch display unit to enable the specific virtual function key corresponding to the first instruction code to generate second prompt information.

5. The universal remote control operation method of claim 4, wherein the first prompt information and the second prompt information are generated as the touch display unit enables the specific virtual function key to perform a flicking or a color change.

6. The universal remote control operation method of claim 1, wherein the step (d) further comprises:
    enabling the processing unit to determine whether the touch display unit receives a confirmation input; and
    determining that the electronic device to be controlled is operated according to the function instruction when the confirmation input is received.

7. The universal remote control operation method of claim 1, wherein the step (g) further comprises recording a corresponding relationship between the specific device code and the electronic device to be controlled according to environment information.

8. The universal remote control operation method of claim 7, wherein the environment information is a wireless access point signal strength around the electronic device to be controlled, a vertical height or a corresponding orientation.

9. The universal remote control operation method of claim 1, wherein the device information comprises a device brand and a device type.

10. A handheld electronic device, having a universal remote control mechanism, comprising:
   a touch display unit, used for receiving device information and displaying a user interface having a plurality of virtual function keys according to the device information;
   a storage unit, used for storing a device code discrimination table comprising a plurality of rows of device codes each corresponding to one specific type of device, wherein each of the plurality of rows of device codes comprises a plurality of instruction codes arranged in an order of a hit rate;
   a wireless transmission unit; and
   a processing unit, used for retrieving the device code discrimination table from the storage unit and initiating a test procedure, wherein the test procedure comprises:
   (a) enabling one instruction code having the highest hit rate in the instruction codes of a specific device code of the device code discrimination table as a first instruction code by the processing unit;
   (b) controlling the touch display unit to receive an input from a specific virtual function key of the virtual function keys by the processing unit, wherein the specific virtual function key corresponds to the first instruction code;
   (c) controlling the wireless transmission unit to transmit a function instruction to an electronic device to be controlled according to the input and the first instruction code by the processing unit;
   (d) determining whether the electronic device to be controlled is operated according to the function instruction by the processing unit;
   (e) excluding the specific device code and the device codes having the same first instruction code in the plurality of rows of device codes by the processing unit when the electronic device to be controlled is not operated according to the function instruction, to enable one device code of the plurality of rows of remaining device codes as the specific device code to repeat steps (a)-(d) for testing;
   (f) further determining whether the first instruction code is a final instruction code of the specific device code by the processing unit when the electronic device to be controlled is operated according to the function instruction, to enable a second instruction code after the first instruction code in the specific device code as the first instruction code to repeat steps (b)-(d) for testing when the first instruction code is not the final instruction code, wherein the step (f) further comprises enabling the processing unit to determine whether the remaining instruction codes are repeated in the specific device code and the device codes having the same first instruction code in the plurality of rows of device codes and to determine whether the repeated instruction codes can enable the electronic device to be controlled to operate according to the function instruction if the instruction codes are repeated and further enabling an instruction code not repeated in the instruction codes as the first instruction code by the processing unit to repeat steps (b)-(d) for testing; and
   (g) terminating the test procedure by the processing unit when the electronic device to be controlled is operated according to the function instruction and the first instruction code is the final instruction code and controlling the electronic device to be controlled by using the specific device code.

11. The handheld electronic device of claim 10, wherein the instruction code having the highest hit rate in the instruction codes is an instruction code appears most frequently among the plurality of rows of device codes.

12. The handheld electronic device of claim 10, wherein the step (b) further comprises enabling the processing unit to control the touch display unit according to the first instruction code and generating first prompt information at the specific virtual function key to enable the touch display unit to receive the input.

13. The handheld electronic device of claim 12, wherein the step (f) further comprises enabling the processing unit to control the touch display unit to enable the specific virtual function key corresponding to the first instruction code to generate second prompt information.

14. The handheld electronic device of claim 13, wherein the first prompt information and the second prompt information are generated by the touch display unit enabling the specific virtual function key to perform a flicking or a color change.

15. The handheld electronic device of claim 10, wherein the step (d) further comprises:
   determining whether the touch display unit receives a confirmation input by the processing unit; and
   determining that the electronic device to be controlled is operated according to the function instruction when the confirmation input is received.

16. The handheld electronic device of claim 10, wherein the step (g) further comprises recording a corresponding relationship between the specific device code and the electronic device to be controlled according to environment information.

17. The handheld electronic device of claim 16, wherein the environment information is wireless access point signal strength around the electronic device to be controlled, a vertical height or a corresponding orientation.

18. The handheld electronic device of claim 10, wherein the device information comprises a device brand and a device type.

* * * * *